United States Patent [19]

Guerin et al.

[11] Patent Number: 5,181,098
[45] Date of Patent: Jan. 19, 1993

[54] PROCEDURE AND DEVICE FOR THE AUTOMATIC CORRECTION OF SKEW, OF COLOR SUPERIMPOSITION, AND OF IMAGE UNIFORMITY FOR TELEVISION CAMERAS

[75] Inventors: Jean-Claude Guerin; Philippe Morel, both of Rennes, France

[73] Assignee: Thomson Comsumer Eletronics, Courbevoie, France

[21] Appl. No.: 761,866
[22] PCT Filed: Jan. 14, 1991
[86] PCT No.: PCT/FR91/00022
§ 371 Date: Oct. 22, 1991
§ 102(e) Date: Oct. 22, 1991
[87] PCT Pub. No.: WO91/11075
PCT Pub. Date: Jul. 25, 1991

[30] Foreign Application Priority Data

Jan. 16, 1990 [FR] France .................. 90 00426

[51] Int. Cl.$^5$ .................. H04N 17/02; H04N 9/093
[52] U.S. Cl. .................. 358/10; 358/139; 358/51
[58] Field of Search .................. 358/10, 51, 139, 163

[56] References Cited

U.S. PATENT DOCUMENTS

| | | | |
|---|---|---|---|
| 4,326,219 | 4/1982 | Griesshaber et al. | 358/10 X |
| 4,503,456 | 3/1985 | Nakamura et al. | 358/51 |
| 4,544,952 | 10/1985 | Pham van Cang | 358/51 X |
| 4,553,164 | 11/1985 | Labb | 358/163 |
| 4,628,342 | 12/1986 | Desmons et al. | 358/10 |
| 4,823,188 | 4/1989 | Fauquet et al. | 358/51 |

FOREIGN PATENT DOCUMENTS

| | | |
|---|---|---|
| 0077239 | 4/1983 | European Pat. Off. |
| 0096600 | 12/1983 | European Pat. Off. |
| 0176406 | 4/1986 | European Pat. Off. |

Primary Examiner—James J. Groody
Assistant Examiner—Mark R. Powell
Attorney, Agent, or Firm—Oblon, Spivak, McClelland, Maier & Neustadt

[57] ABSTRACT

The device for implementation of the invention procedure, a processor (2) is connected by a data bus (12) to a correction memory (3), a measuring circuit (9), and a digital-to-analog converter (4), and an adder circuit is connected to the output of the digital-to-analog converter (4) and to the output of the scanning circuit of the camera, so as to add to the sawtooth signal supplied by the camera the correction values furnished by the correction memory in synchrony with the scanning of the camera. The correction values result from an evaluation of the position error of the centers of the patterns of an optical grid as restored by the camera and of their equivalents in an electronic grid. Intermediate correction values are computed for each pattern by interpolation of the position errors of the centers of the patterns, using a third-order interpolation polynomial. The invention can be used in high-definition television applications.

12 Claims, 5 Drawing Sheets

PROCEDURE AND DEVICE FOR THE AUTOMATIC CORRECTION OF SKEW, OF COLOR SUPERIMPOSITION, AND OF IMAGE UNIFORMITY FOR TELEVISION CAMERAS

FIELD OF THE INVENTION

The present invention concerns a procedure and a device for the automatic correction of skew, of color superimposition, and of image uniformity for television cameras.

DESCRIPTION OF RELATED ART

The use of a camera to obtain a faithful monochrome image presupposes the existence of a completely linear relationship between the "time" variable and the coordinates of any point whatever within the scene being scanned. Now, filming optics, the scanning tube, and its associated electronics produce distortions termed "skew," which prevent the electronic image of a completely periodic optical pattern from any longer exhibiting this appearance locally. In particular, filming optics produces distortions at the edge of the image in the form of pads or drums. The scanning tube and its associated electronics do not make it possible to obtain (and to measure) completely linear high-voltage ramps, especially since the reduction of scanning noise requires the greatest possible reduction of the pass-band of the amplifiers, and since obtaining a faithful color image requires, in addition to observing the linearity between the time variable and the position of each point of the scene being scanned, that the three electronic beams of the three tubes R, G, and B simultaneously scan the three data emanating from each single point of the source image. "Differential" distortions between the red and blue tubes and the green reference tube are added to the "common mode" distortions mentioned above. The optical system obviously plays a part in this distortion, because magnification depends on wavelength. The spacings separating tube position, the differential astigmatism between the tubes, and the electronics, through the dispersion of component characteristics, also contribute to these distortions.

Furthermore, the presentation of a uniformly white scene to a three-tube camera generally supplies video signals at the output of each tube, these signals exhibiting variations of level as a function of the positions of the points scanned.

This situation can be ascribed to the lens-vignetting phenomenon, to the phenomenon of diffusion of the loads in the filming tubes on the periphery of the unscanned screen areas, and to the variations in scanning speed, in particular along the vertical dimension of the image.

All of these phenomena contribute to the appearance of blanking spots in the white parts of the image.

Inversely, when the lens is completely closed, a non-uniformity of the level of black is produced which results principally from the non-uniformity of the shower lighting. For a color camera, the difference in uniformity between levels leads to the appearance of color changes.

The appearance of spots may also result from the compensation for defects of skew and of superimposition, which consist in the modulation of horizontal and vertical scanning speeds.

One conventional method for solving this problem consists in generating characteristic predistortion functions.

This method is based on the assumption that if distortions appear within the image, the necessary corrections must be able to be expressed as polynomials.

However, this method is limited by the order of the highest polynomial generated and by the optimization algorithm applied, which rapidly becomes complex when the number of coefficients increases. Furthermore, the generation of signals representative of the elementary products at $x^i\, y^j$ of the polynomial must preserve adequate temperature and temporal stability, which is achieved only with difficulty.

SUMMARY OF THE INVENTION

The purpose of the invention is to overcome the difficulties cited above.

To this end, the object of the invention is a procedure for automatic correction of skew, of color superimposition, and of image uniformity for television cameras, by means of an optical grid placed in front of the camera and composed of predetermined patterns whose centers of rotation are located, in accordance with a matrix structure, at the points of intersection of evenly-spaced rows and columns, and by means of an electronic reference grid which is an image of the optical grid, each homologous optical and reference grid being scanned during line scanning by the camera using scanning means to furnish two video signals, this procedure being characterized by the fact that it consists in measuring the position error of the centers of rotation of the patterns reconstructed by the camera in relation to their respective positions on the electronic reference grid; in computing a first series of correction values in order to eliminate the position errors of the centers of rotation in computing for each pattern requiring correction a second series of correction values of the positions of the points of the patterns located in the middle of straight-line segments positioned on either side of the centers of rotation by means of a cubic interpolation computation which takes into account, for each pattern, the position error of its centers of rotation and the position errors of the barycenters of the patterns which surround it in the vertical dimension of the grid; and in storing the first and second series of correction values in order to be able to apply them to the scanning means of the camera in synchrony with the horizontal and vertical scanning operations of the camera.

Other features and advantages of the invention will emerge from the following description provided with reference to the attached drawings.

DESCRIPTION OF THE PREFERRED EMBODIMENT

Rather than seeking the coefficients of the best possible limited polynomial which compensates optimally for errors, the procedure according to the invention consists in evaluating an error function at a large number of points N of the image supplied by a television camera; in computing the corresponding correction values based on data supplied by a standard grid comprising alternating lines of patterns in the shape of rectangles or parallelograms; and in storing these results in a memory linked to a digital-to-analog converter which injects a correction signal that is either additive (scanning or dark spot scanning) or multiplicative (correction of white spots).

Perfect compensation for defects over the entire image presupposes:

precise compensation for the defects measured on the N measurement points;

computation of the most faithful interpolation possible of the "missing" NCI corrections. (NCI designates a number of corrections computed by interpolation.)

The NCI number verifies the equation:

$$NCI = NCL \times NL - Q \times P \qquad (1)$$

where:

NCL designates the number of corrections per line (visible and non-visible areas);

NL is the number of measurements per line; and

P is the number of measurement lines for a type of pattern (rectangle or parallelogram).

N.B.: $P \times Q = N$ equals the number of measurement points for one type of pattern.

The first point is obtained by an iterative procedure. The entirety of the measured errors during a first measurement pass over N points is noted $[\epsilon_1, rk, i]$;

rk designates the number of the measurement line in the image;

k is a whole number such that $o \leq k \leq P-1$ corresponding to the number of the measurement line;

r designates the number of lines of the image contained between two successive measurement lines on patterns of the same type (rectangles or parallelograms);

i designates the number of the column, such that $0 \leq i \leq Q - 1$;

For all number 1 lines in the image which are not measurement lines, 1 is such that:

$$rk < 1 < r(k+1) \text{ and } l = rk + t \text{ with } 1 < t < r-1 \qquad (2).$$

The set $[\epsilon_1, rk, i]$ gives rise to two subsets of corrections:

$$[CP_1 \, rk, i] \text{ and } [CI_1, l, c]$$

where:

$CP_1 \, rk, i$ is a "primary" correction corresponding to the error $\epsilon_1 \, rk, i$ measured during the first pass;

$CI_1, l, c$ is a correction applied to the intersection of line l and of the column c and interpolated based on the four closest primary corrections, as will be described later. 1 and c confirm the equations:

$$0 \leq 1 \leq NL - 1 \text{ and } 0 \leq c \leq NCL - 1.$$

If introduction of the correction is inadequate or too great, the corresponding error is only partially eliminated, or it may even change sign. For this reason, a second measurement pass is made which produces a set $[\epsilon_1 \, rk, l]$ of measurements, then to two new subsets of corrections:

$$[CP_1, rk, i + CP_2, rk, i] + [CI_2, l, c].$$

The process continues until the residual error becomes virtually nil; the sum of the primary errors accumulated over time completely compensating for the initial error.

The second point concerns the optimal computation of the missing NCI corrections, which takes place during each pass n. Each missing correction $[CI_n, rk+t, i]$ is computed based on the four primary corrections of the four closest points located on the same column i as the point under consideration:

$$CI_n, rk+t, i = f(CP_n, r(k-1), i);$$

$$CP_n, rk, i); (CP_n, r(K+1), it);$$
$$(CP_n, r(k+2), i); t]$$

The function f selected is a cubic spline function chosen for its continuity and derivative properties. It ensures the most "natural" evolution possible between the corrections obtained on the measurement points of a single column.

For points for which measurements are missing (top and bottom of the image), use is made of an interpolation on three points, or of a linear extrapolation when only two primary correction points are available.

Furthermore, corrections on columns for which no measurements exist must be computed. These columns, which correspond to areas of line deletion, are located outside the visible zone, to the right and left of the image. The purpose of the corrections computed there is to ensure the most harmonious transition possible between the end of one line and the beginning of the next. In fact, to know at each instant the value of the correction voltage that is applied to the end and that emanates from the ripple filter, the coiled arrangement of this filter must be taken into account. Accordingly, to obtain the desired correction-voltage values at the end and at the beginning of each line, values progressing as naturally as possible between the two consecutive lines must be introduced at the filter input. For points located at the end of line u on the column v $(v > Q - 1)$:

$$C_n, u, v = f(C_n, u, Q-2); (C_n, u, Q-1); (C_n, u+1, 0);$$
$$(C_n, u+1, l); v)].$$

For those located at the beginning of the line u on column v (v, 0):

$$C_n, u, v = f(C_n, u-1, Q-2); (C_n, u-1, Q-1);$$

$(C_n, u, 0); (C_n, u, 1); v]$

The function selected is, here again, a cubic function.

Figure 1:
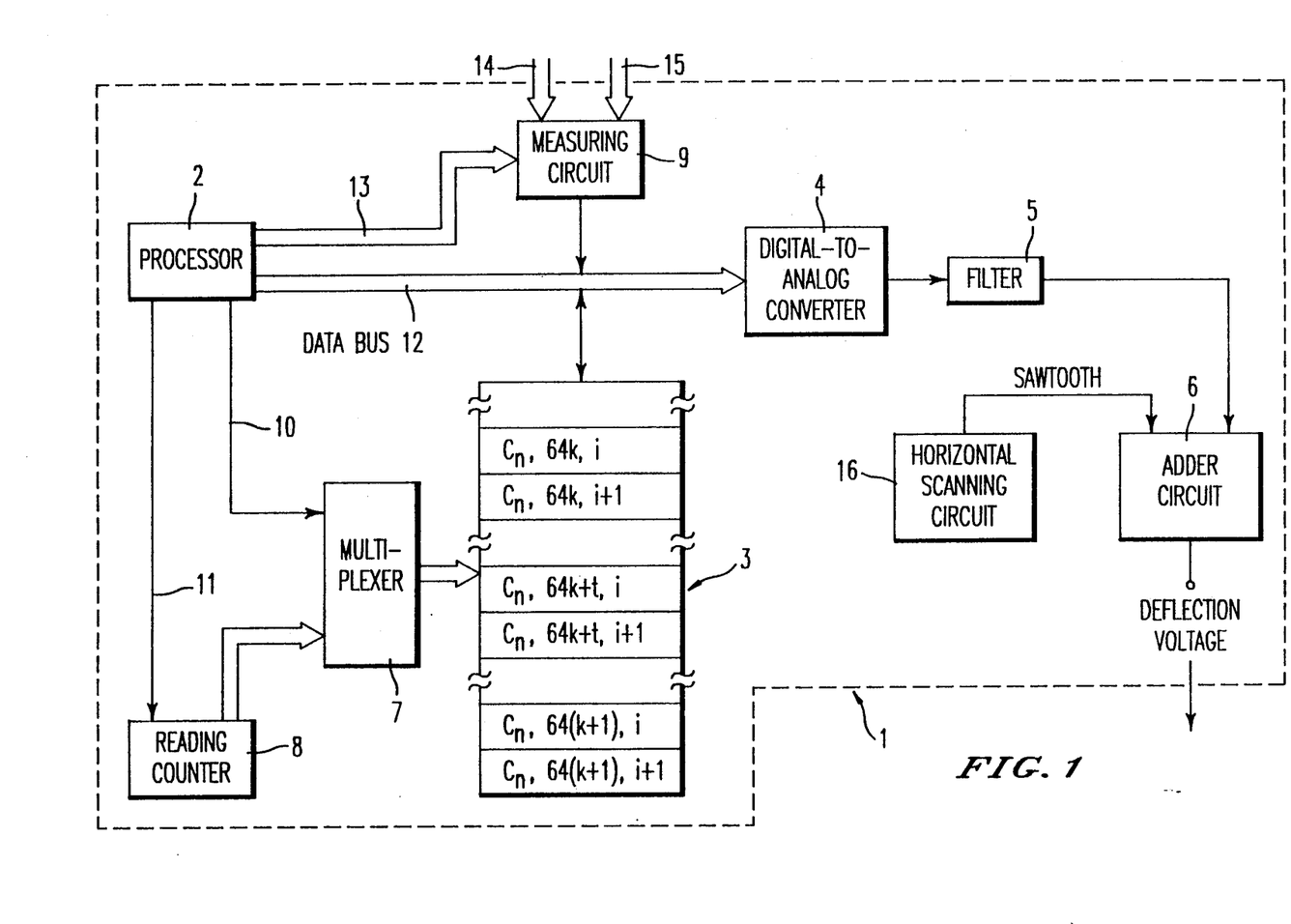
FIG. 1 is a device used by the invention to store correction values to be assigned to the points of the image.

A correction device according to the invention making it possible to obtain these results is shown in FIG. 1, inside the dotted lines.

This device comprises, arranged around a processor 2, the following components: a random-access memory 3, a digital-to-analog converter 4, a filter 5, an adder analog circuit 6, a multiplexer 7, a reading counter 8, and a measuring circuit 9. The memory is addressed, through the multiplexer 7, in the output mode, by an address bus 10 connected to the processor 2, and in the reading mode, by the reading counter 8. The content of the reading counter 8 is initialized by the processor 2 using an initialization line 11.

A data bus 12 shared by the processor 2, the memory 3, and the digital-to-analog converter 4 carries the correction values computed by the processor 2 between the processor 2, the memory 3, and the digital-to-analog converter 4. A control line 13 ensures the control of the measuring circuit 9 by the processor 2. Links 14 and 15 make it possible to feed to the measuring circuit 9 video signals furnished, on the one hand, by a standard grid and restored, on the other hand, by the camera to be corrected.

The filter 5 filters the analog signal supplied by the digital-to-analog converter 4. The filtered voltage obtained is added, in the adder circuit 6, to the sawtooth scanning signal furnished by the scanning circuit 11 of the image-scanning tube of the camera requiring correction. This arrangement allows the rereading of the correction values recorded in the memory 3 in synchrony with the video scanning signal of the camera.

To profit from the maximum degree of flexibility (at the expense of a larger memory area), each intermediate correction interpolated between two adjacent primary corrections in the vertical dimension of the image is computed in delayed time by the processor 2, then stored in the memory 3 instead of being computed in real time by a hard-wired interpolator.

The analog filter 5 performs the required smoothing between two successive corrections (line interpolation).

Of course, for the correction of a color camera, the correction device just described can easily be adapted to each scanning circuit of each of the green, blue, and red image-scanning tubes, a single processor 2 performing the computation required for the correction of the three scanning tubes based on a single measuring circuit that can receive, depending on the selection made, the three red, green, and blue signals in addition to the signal delivered by the standard grid.

Figure 2:
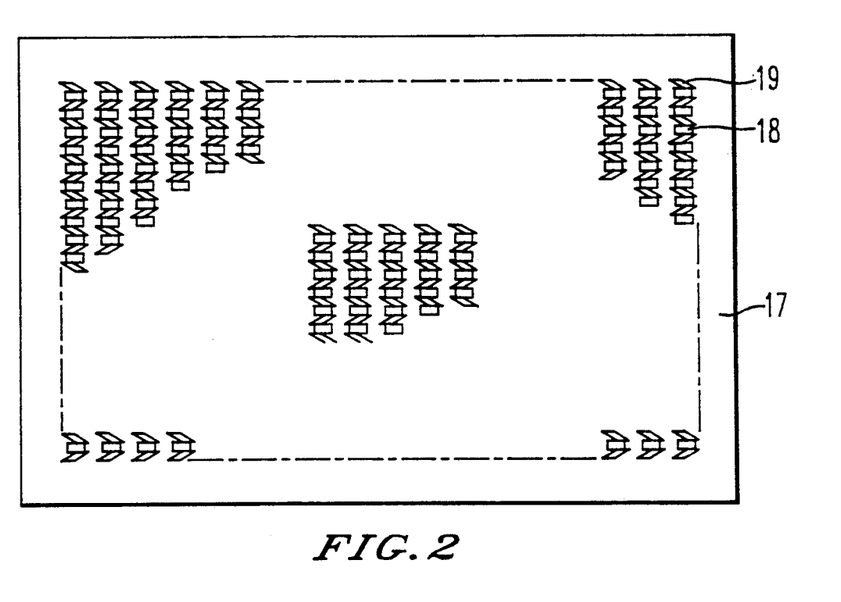
FIG. 2 is a drawing of an optical grid utilized by the invention to specify errors and restore the correction values.
Figure 3:
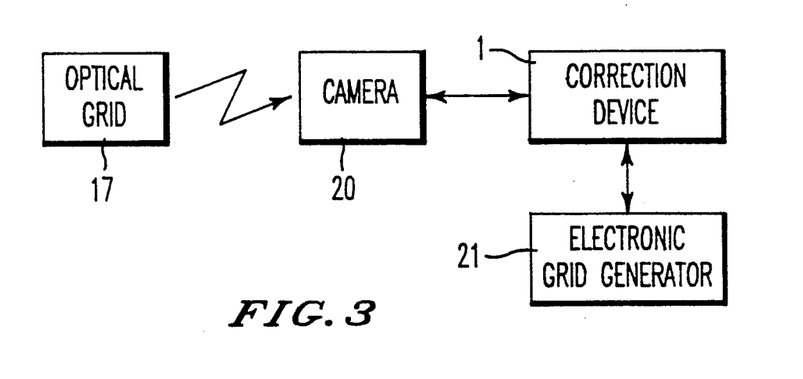
FIG. 3 is a measurement system used to formulate the correction values.

Correction values are formulated using a highly accurate optical grid 17, shown in FIG. 2, and a measuring system, illustrated in FIG. 3.

The optical grid 17 comprises $p=37$ functional horizontal alternating rows of patterns of the same size and in the shape of rectangles 18 or parallelograms 19, and having the same height in the vertical dimension of the image. These patterns are also aligned by their centers of rotation in the vertical dimension of the image along $q=20$ vertical, evenly-spaced rows, each of which is composed of an alternating series of contiguous patterns in the shape of rectangles or parallelograms. Furthermore, the inclination of the parallelograms along the horizontal dimension of the image remains the same for all of the patterns in a single row, while, however, alternating, from one row of parallelograms to the next or to the preceding one, between a first value and its value that is complementary to 180°.

The entirety of the patterns thus forms a matrix of $NT=740$ functional patterns, whose centers of rotation are positioned at the points of intersection of $PT=37$ lines and 20 columns. The measurement system is formed by a television camera 20 requiring correction and linked to an electronic grid generator 21, which are linked through the correction device 1 in FIG. 1. The optical grid 17 is placed in the measurement system opposite the camera 20. In this way, each pattern analyzed during the line scanning performed by the camera can be considered to be formed by juxtaposition of parallel straight-line segments having the same luminance and/or chrominance and extending in the vertical dimension of the grid, on either side of its centers of rotation.

The electronic grid generator 21 forms a synthetic video signal which would be the signal supplied by the camera 20 if the signal-scanning system of the camera were perfect. Evaluation of the error introduced by the scanning system is then obtained by measuring the temporal interval between the real video signal and the synthesized video signal applied over the links 14 and 15 of the measuring circuit 9 in FIG. 1. Examples of the appearance of these errors are given in FIGS. 4A to 4H.

Figures 4A, 4B:
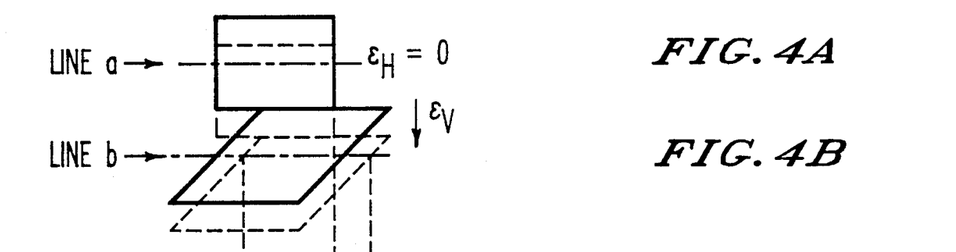
FIGS. 4A to 4H are examples of the offset between symbols obtained by superimposition of an optical grid and of an electronic grid.

In the example shown in FIG. 4A, the scanning system of the camera introduces only one distortion ($\epsilon v$) along the vertical axis of the image, no temporal deviation along the horizontal axis ($\epsilon_h = 0$) existing between the rectangular patterns 18 of the optical grid 17 and the corresponding patterns of the electronic grid furnished by the electronic grid generator 21. On the other hand, as shown in FIGS. 4E, 4F, when distortion along the horizontal axis appears, it produces a temporal shift $\Delta tMD$ in that direction of the corresponding signals shown in FIGS. 4G and 4H. A marked measurement of this error can, consequently, make it possible to compute an adequate marked correction in order to reduce the preceding measured error.

Figures 4C, 4D:
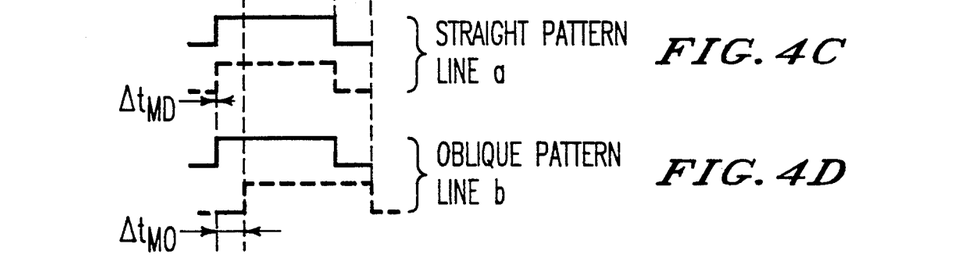
Figures 4E, 4F:
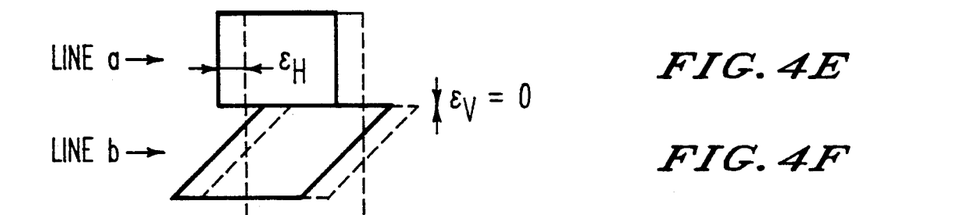
Figure 4G:
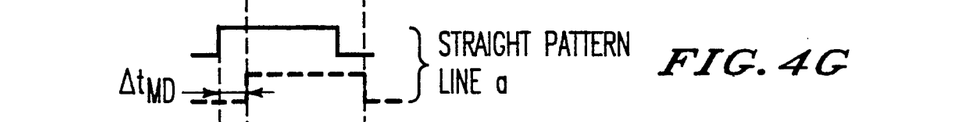
Figure 4H:
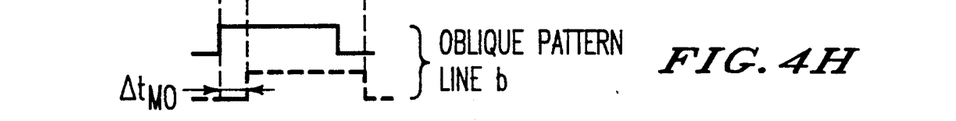

For the parallelogram-shaped patterns shifted in the manner represented in FIG. 4B, the corresponding measured temporal shift $\Delta tMD$ shown in FIG. 4D results from the linear combination of the spatial shifts along the horizontal and the vertical. The alternation of the rectangular and parallelogram patterns along the vertical axis allow estimation of the spatial horizontal error on one parallelogram-shaped pattern as a function of the horizontal errors measured on the two rectangular patterns which surround it; it further makes it possible to obtain, from the parallelogram-shaped patterns, a solely vertical distortion datum.

Although, in principle, it is possible to make approximately 48,000 measurements on the entire image, on 1,200 lines of 20 patterns per line on each front and rear edge of the images, the processor 2 in FIG. 1 can be programmed so as to retain only the average values of the errors between the front and rear edges evaluated on the lines corresponding to the centers of rotation of the electronic grid and on one frame only.

This computation makes it possible, on the one hand, to improve the signal-to-noise ratio of the resulting measurement, and, on the other, to synchronize optimally two patterns which do not have the same temporal duration. In fact, in cases in which the scanning procedures are not highly linear, the duration of a pattern analyzed by the camera at the beginning of a line may be longer or shorter than the duration of the corresponding pattern of the electronic grid supplied by the grid generator 21.

Figure 5A:
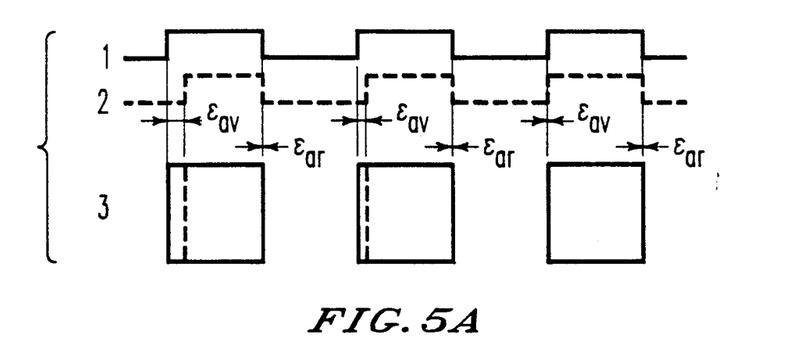
FIGS. 5A and 5B represent shifts between edges corresponding to squared symbols of two superimposed optical and electronic grids.
Figure 5B:
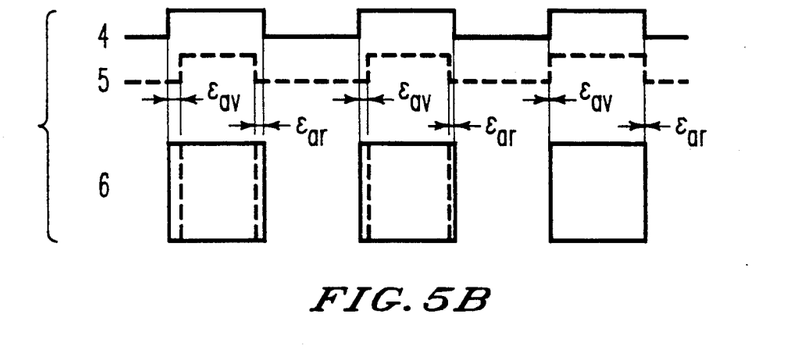

Consequently, if the measurements were made solely on one edge, the error on the front edge would be very great, as shown in FIG. 5A. On the other hand, by performing the calculation of the average value of the position errors on the two edges, the skew errors for which no compensation is possible (due to non-linearities) are distributed equally between the two edges, as shown in FIG. 5B. This computation also makes it possible to obtain the correct superimposition of the red and blue signals in relation to the green signal. In this case, in fact, the differences in rise and falling times of the three signals due to the phenomena of attraction and astigmatism also lead to differences in the duration of signals measured at 50% of their maximum amplitude. The computation of the average value of the position of the edges distributes, accordingly, the colored border between two edges and thus attenuates its visibility.

Of course, complete compensation for the phenomena cited can be obtained by increasing the number of points of measurement on each line, and thus the frequency of operation of the digital-to-analog converters. In this case, the range of compensation which is directly inversely proportional to the number of patterns in a line is reduced, and the storage capacity, increased.

With respect to the use of the grid shown in FIG. 2, the processor 2 can perform only $N = PxQ = 18 \times 20 = 360$ points of measurement of horizontal errors and $N = PxQ = 19 \times 20 = 380$ points of measurement of vertical errors corresponding to the points located at the centers of rotation of the patterns, and the corrections to be effected for the missing lines will be computed by interpolation by the processor 2. This leads, for example, for image resolution comprising 1,200 scanning lines, to computing a set of $63 \times 4$ coefficients for 63 line spacings.

Figure 6:
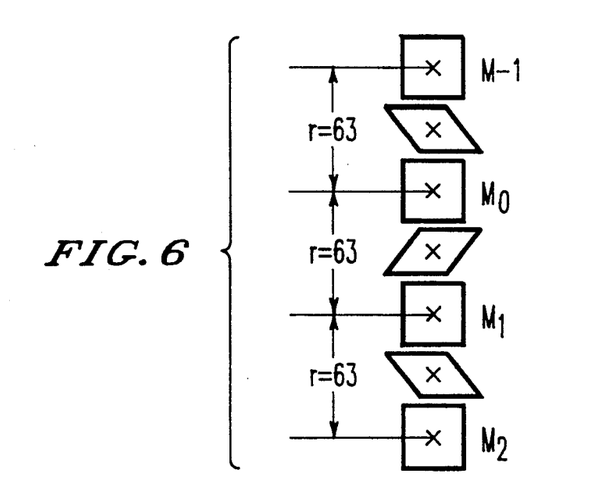
FIG. 6 is a vertical arrangement of patterns illustrating the method for computing the intermediate correction values between consecutive measurement points arranged vertically on a single column belonging to the image.

To abolish the discontinuities which generate white spots that could appear between the correction signals associated with adjacent lines located on a single column, the set of coefficients selected for interpolation is formed by the coefficients of a third-order polynomial function. The processor 2 computes locally, between each pair of consecutive points of measurement ($M_0$, $M_1$) along the vertical, such as those represented in FIG. 6, a polynomial having the form:

$$P(x) = ax^3 + bx^2 + cx + d \quad (3),$$

whose characteristic curves pass through the points $M_0$ ($x = 0$) and $M_1$ ($x = 1$) of coordinates $x = 0$ and $x = 1$ of each pair. To determine the four parameters (a, b, c, d) of the polynomial, the computation also takes into account the fact that the derivative of the polynomial can be assigned to the points of coordinates $x = 0$ and $x = 1$. This derivative is calculated by a relation having the form $\frac{1}{2}(M_1 - M_{-1})$ for $x = 0$ and $\frac{1}{2}(M_2 - M_0)$ for $x = 1$.

In the preceding description, $M_1$ represents a measurement made in the middle of the pattern preceding the point of measurement $M_0$, i.e., in the example described, that located 64 line spacings above.

$M_2$ represents the measurement on the middle of the pattern following the point of measurement $M_0$, i.e., in the case of the pattern in FIG. 2, that located 64 line spacings below.

The evaluation of the system of four equations embodying four unknowns, which results from the preceding conditions, imparts to coefficients a, b, c, and d the following values:

$$a = -\tfrac{1}{2}M_{-1} + 3/2 M_0 - 3/2 M_1 + \tfrac{1}{2}M_2 \quad (4)$$

$$b = M_{-1} - 5/2 M_0 + 2M_1 - \tfrac{1}{2}M_2 \quad (5)$$

$$c = -\tfrac{1}{2}M_{-1} + \tfrac{1}{2}M_1 \quad (6)$$

$$d = M_0.$$

Around the coordinate points $x = 0^+$ the derivative of the polynomial equals $c = \tfrac{1}{2}M_1 - \tfrac{1}{2}M_{-1}$, m and, for $x = 1^-$ the derivative of the polynomial equals $3a + 2b + c = -M_0/2 + M_2/2$.

Under these conditions, the derivative to the left of the point $M_1$ ($x - 1$) is identical to the derivative to the right of point $M_1$, which is computed in the interval ($M_1$, $M_2$), and there is no abrupt break in the first derivative of correction along the vertical axis. This result is of primary importance, since it prevents the appearance of spots on the white background of the image which result, essentially, in correction devices according to prior art, from variations in the vertical scanning speed of the image.

Along the horizontal, the corrections of the columns for which no measurements exist (blanked zone) are also computed by means of a cubic polynomial. The corrections taken into account for the computation of the coefficients a, b, c, and d fall on the columns where measurements were made, the last and next to last corrections of line n and the first and second of line $n + 1$.

Smoothing between two adjacent points of measurement in a line is achieved by the analog low-pass filter 5.

To ensure an harmonious transition between the end of one line and the beginning of the following line, four additional points computed by a set of $4 \times 4$ coefficients are added to the 20 measured (or interpolated) points.

At the end, based on 360 points of measurement of horizontal error (380 points of vertical measurement respectively), 30,000 horizontal (vertical) corrections are computed for every image ($1,250 \times 24$).

Under these conditions, all of the computations can be made on the basis of 16-bit words at input (corrections on the middle of the patterns and coefficients), but intermediate results can also be coded on 32 bits by means of the processor 2, so as not to propagate rounding errors.

At the end, each correction (middle of pattern or interpolated) is stored in a format of 16 marked bits in the correction memory 3 in question.

The 12 high-order bits are sent to the digital-to-analog converter 4.

The correction voltages obtained after filtering are added by the adder circuit 5 using all conventional means known (not shown) to the camera 20 plate-deflection voltages.

For dark spots, the principle remains identical, but the correction is made on the video signal.

Corrections of white spots may be obtained in a similar manner, by modulating the control voltage of a variable gain amplifier, in order to modify the amplitude of the video signal.

In the two preceding cases (correction of spots), the measuring circuit 9 is replaced by a detector which measures the amplitude of the video signal at different points of the image. Here again, only the points corresponding to the centers of rotation of the patterns of the electronic grid are preserved as points of measurement, and, for each point, calculation is made of the relative difference in amplitude in relation to the central points of measurement, considered as embodying the reference level. Attempts are thus made to ensure that all of the points of measurement have the same video level as the points located in the center of the image. It then becomes necessary only to redo the same interpolation calculation as that previously mentioned to extend to the entire image the corrections corresponding to the relative differences on the points of measurement. By presenting a uniform white space in front of the camera and by sending the corrections to a variable gain amplifier, the white spot defects are corrected, while, if the lens is closed and if the corrections to the video signal are added up, the dark spot defects are corrected.

Figure 7A:
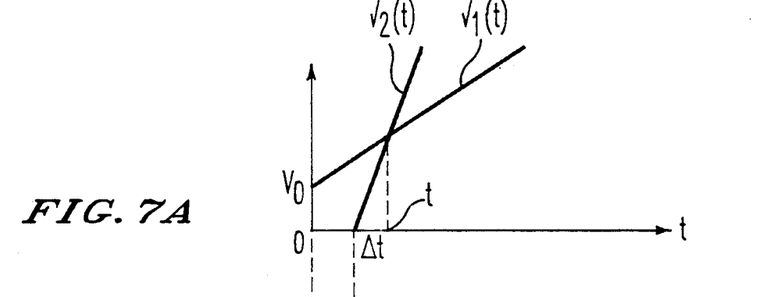
FIGS. 7A, 7B, and 7C are curves illustrating the principle underlying measurement of the temporal intervals between patterns.
Figure 7B:
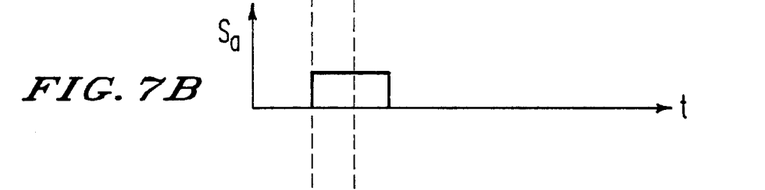
Figure 7C:
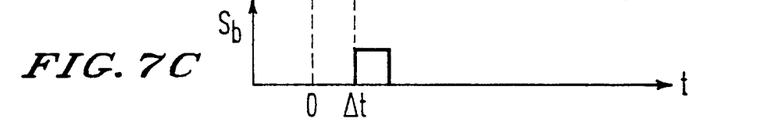

The measurement of the temporal differentials between homologous pattern edges of the optical grid 17 restored by the camera 20 and the electronic grid supplied by the electronic grid generator 21 is based on the determination of the point of intersection of two ramps $V_1(t)$ and $V_2(t)$ of different slopes than can be represented by linear equations having the form:

$$V_1(t) = \beta' a_1 t + V_0 \qquad (8)$$

$$V_2(t) = a_1(t - \Delta t) \qquad (9)$$

and triggered at the instants when each pattern to be compared appears. As shown in FIGS. 7A, 7B, and 7C, the first ramp $V_1(t)$ having slope $\beta' a_1$ (with $\beta' > 1$) and having an initial value $V_0$ is triggered at the instant of appearance of the first of two signals $S_a$ and $S_b$ representing each homologous pattern to be compared. The second ramp $V_2(t)$ having a slope equal to $a_1$ begins at the instant of appearance of the second signal $S_a$ or $S_b$ representing the second pattern homologous to the preceding pattern to be compared.

The two ramps $V_1(t)$ and $V_2(t)$ intersect at a specified instant according to the equation:

$$\tau = \frac{\Delta t}{1 - \beta'} + \frac{V_0}{a_1(1 - \beta)} \qquad (10)$$

In equation (10), the quantity $$\frac{V_0}{a_1(\beta' - 1)}$$

represents a a temporal threshold value which depends on the initial value $V_0$ of the first ramp $V_1(t)$. The advantage of this initial value is that, when it is chosen so as to be sufficiently large, it makes it possible to remove the point of intersection of the two ramps from the instant of their triggering, so as to render negligible the influence of the non-linearities present at the origin of the ramps on the measurement of time $\tau$. Because of this arrangement, the temporal interval $\Delta t$ between two consecutive edges of the signals $S_a$ and $S_b$ may be expanded and multiplied at will using the factor $$\frac{a1}{1 - \beta 1},$$

this factor becoming very large as $\beta'$ approaches unity.

Figure 8:
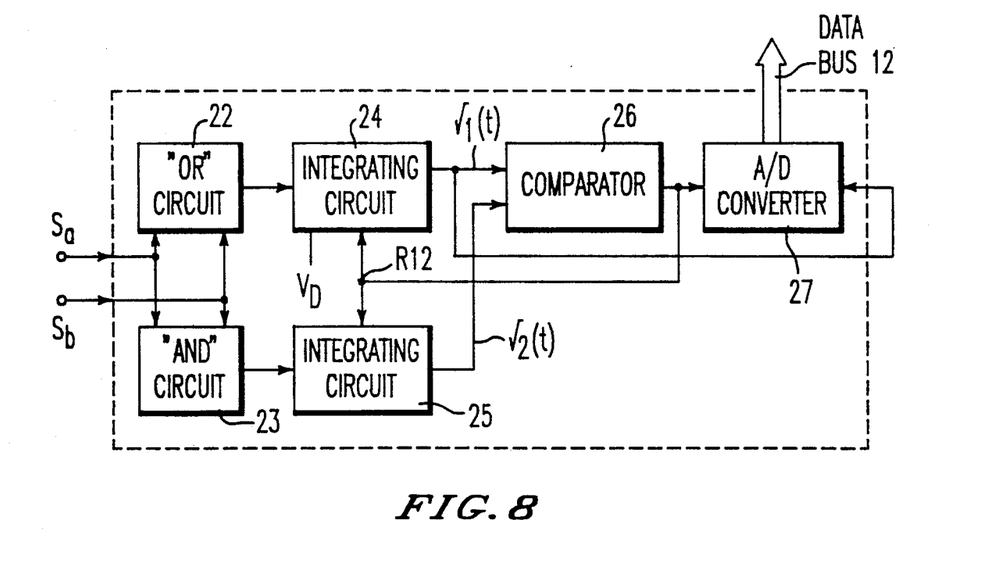
FIG. 8 is an embodiment of a circuit for measurement of the temporal intervals, in accordance with the invention.

The signals representative of the two ramps $V_1(t)$ and $V_2(t)$ are generated inside the measuring circuit 9. This circuit comprises, in the manner shown in FIG. 8, an OR circuit 22, an AND circuit 23, a first integrating circuit 24, a second integrating circuit 25, a comparator circuit 26, and an analog-to-digital converter 27 whose input is connected to the output of the integrator $V_1(t)$. The first integrating circuit 24 is initialized to the value $V_0$ and is controlled by the output of the OR circuit 22 when the first of the edges producing signals $S_a$ or $S_b$ appears at the inputs of the OR circuit 22. The second integrating circuit 25 is controlled by the output of the AND circuit 23 when the signals $S_{(a)}$ and $S_{(b)}$ are present simultaneously, i.e., when they reach the same high voltage level at instant $\Delta t$, as illustrated in FIGS. 7A and 7C. The outputs of the first and second integrating circuits 24 and 25 are connected to a first and second output, respectively, of the comparator circuit 26, whose output is connected to a sampling-control input of the analog-to-digital converter. The value of $V_1(t)$ sampled at instant $\tau$, which is such that $V_1(\tau) = V_2(\tau)$, is a linear function of the interval $\Delta t$ separating these two events:

$$\Delta t = \frac{V_1(\tau)(1 - \beta') - V_0}{a_1 \beta'}$$

$$V_1(\tau) = \frac{\beta' a_1}{1 - \beta'} \Delta t + V_0 1/1 - \beta'.$$

It is easy to calibrate the measuring system by feeding two identical signals to the input, and thus to learn and subtract the quantity $V_0/1 - \beta'$.

Of course, the measurement of the time intervals between the falling edges of the signals $S_a$ and $S_b$ can be obtained in a similar manner by feeding the complementary (inverted) values of the signals $S_a$ and $S_b$ to the inputs of circuits 22 and 23 by means of appropriate inverter circuits (not shown).

The digital values thus obtained are fed successively to the data bus 12 in order to allow the processor 2 to compute average values of the measuring intervals between rising and falling edges of each of the patterns scanned.

We claim:

1. Procedure for automatic correction of skew, of color superimposition, and of image uniformity for television cameras, by means of an optical grid placed in front of a camera and composed of predetermined homologous patterns whose centers of rotation are located, in accordance with a matrix structure, at points of intersection of evenly-spaced rows and columns, and by means of an electronic reference grid which is analogous to the optical grid, each homologous pattern of the optical and reference grids being scanned during line scanning by the camera using scanning means so as to furnish two video signals, the procedure comprising the steps of:

measuring position errors of the centers of rotation of patterns reconstructed by the camera in relation to their respective positions on the electronic reference grid;

computing a first series of correction values for eliminating the measured position errors of the centers of rotation of each pattern requiring correction;

computing, for each pattern requiring correction, a second series of correction values for points of the patterns located on vertical straight-line segments positioned adjacent opposed sides of the centers of rotation by means of a cubic interpolation computation which takes into account, for each pattern requiring correction, the measured position error of the pattern's center of rotation and the measured position errors of the centers of rotation of patterns of the optical grid which are in the pattern's column;

storing the first and second series of correction values; and sending the stored first and second series correction values to the scanning means of the camera in synchronism with horizontal and vertical scanning operations of the camera to perform the correction.

2. Procedure according to claim 1, wherein the optical and electronic grids comprise PT alternating horizontal rows of identically-sized patterns in the shape of rectangles and parallelograms, and Q vertical rows of rectangular- and parallelogram-shaped patterns alternating on each vertical row.

3. Procedure according to claim 2, wherein the inclination of the parallelograms with respect to the horizontal dimension of the pattern remains the same for all of the patterns in a single row and alternates, from one row of parallelograms to the next, between a first value and a value supplemental to the first value.

4. Procedure according to claim 2, wherein the patterns arranged in vertical rows of the grid are contiguous.

5. Procedure according to claim 1, wherein the measuring of the position errors of the centers of rotation is performed by measuring intervals between front and rear edges of the patterns supplied by the camera in relation to respective positions of front and rear edges of the patterns supplied by the electronic grid, and by computing, for each pattern, the average value of the position intervals of each of the two edges.

6. Procedure according to claim 5, wherein the position interval of an edge is determined by computing the coordinates of the point of intersection of two ramps $V_1(t)$ and $V_2(t)$, which can be represented as a function of time t by equations of the form:

$$V_1(t) = \beta' a_1 t + V_o, \text{ where } \beta' < 1$$

$$V_2(t) = a_1(t\Delta t),$$

where $a_1$, $\beta' a_1$, and $V_o$ are coefficients, the ramps being triggered respectively at the instants when the edges of the patterns to be compared appear.

7. Procedure according to claim 1, wherein the cubic interpolation computation takes place using a polynomial P(x) having the form:

$$P(x) = ax^3 + bx^2 + cx + d,$$

where:
$a = -\frac{1}{2} M_{-1} + 3/2 M_0 - 3/2 M_1 + \frac{1}{2} M_2$
$b = M_{-1} - 5/2 M_0 + 2 M_1 - \frac{1}{2} M_2$
$c = -\frac{1}{2} M_{-1} + \frac{1}{2} M_1$
$d = M_0$, where $M_{-1}$ and $M_2$ represent position errors of the centers of rotation of patterns preceding and following point $M_0$ on a measuring column.

8. An apparatus for automatic correction of skew, color superimposition, and image uniformity for a television camera having a scanning means, comprising:

an optical grid having predetermined homologous patterns defining centers of rotation located at points of intersection of evenly spaced rows and columns;

an electronic reference grid which is analogous to the optical grid;

a scanning means for scanning the optical grid;

means for measuring position errors of the centers of rotations of the patterns of the optical grid in relation to their respective positions on the electronic reference grid;

first means for computing a first series of correction values for eliminating the measured position errors of centers of rotation;

second means for computing a second series of correction values for positions of points of the patterns located on vertical straight line segments adjacent opposed sides of the centers of rotation by means of a cubic interpolation computation which takes into account for each pattern, the measured position error of the pattern's center of rotation and the measured position error of the centers of rotation of patterns of the optical grid which are in the pattern's column;

means for storing the first and second series of correction values; and means for sending the stored first and second series correction values to the scanning means of the camera in synchronism with the horizontal and vertical scanning operations of the camera.

9. An apparatus according to claim 8, wherein the means for sending comprises:

an analog adder circuit connected to an output of a digital to analog converter and to an output of the scanning means of the camera, so as to add to a saw tooth signal supplied by the camera an analog form of the first and second series of correction values.

10. An apparatus according to claim 9, wherein:

the adder circuit is connected to the output of the digital-to-analog converter through a low-pass filter.

11. An apparatus according to claim 9, wherein the measuring circuit comprises:

a first and second integrating circuit connected to a comparator and an analog-to-digital converter to supply the ramps ($r_1(t)$ and $r_2(t)$) and compute the coordinates of the ramps' point of intersection.

12. Procedure for automatic correction of skew, of color superimposition, and of image uniformity for television cameras, by means of an optical grid placed in front of a camera and composed of predetermined homologous patterns whose centers of rotation are located, in accordance with a matrix structure, at points of intersection of evenly-spaced rows and columns, and by means of an electronic reference grid which is analogous to the optical grid, each homologous pattern of the optical and reference grids being scanned during line scanning by the camera using scanning means so as to furnish two video signals, the procedure comprising the steps of:

measuring position errors of the centers of rotation of the patterns reconstructed by the camera with respect to their respective positions on the electronic reference grid;

computing a first series of correction values for eliminating the measured position errors of the centers of rotation of patterns requiring correction;

computing for each pattern requiring correction, a second series of correction values for points of the patterns which have not had a position error measured by a computation, including cubic interpolation, which takes into account for each pattern requiring protection, the measured position error of the center of rotation of a pattern containing points and the measured position errors of the centers of rotation of patterns in proximity to the pattern containing the points;

storing the first and second series of correction values; and sending the stored first and second series correction values to the scanning means of the camera in synchronism with the horizontal and vertical scanning operation of the camera to perform the correction.

* * * * *